United States Patent
Hayashi

(10) Patent No.: US 9,698,711 B2
(45) Date of Patent: Jul. 4, 2017

(54) CONTROL DEVICE FOR MULTI-PHASE AC MOTOR

(71) Applicant: DENSO CORPORATION, Kariya, Aichi-pref. (JP)

(72) Inventor: Jirou Hayashi, Ama (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/676,004

(22) Filed: Apr. 1, 2015

(65) Prior Publication Data

US 2015/0326166 A1   Nov. 12, 2015

(30) Foreign Application Priority Data

May 7, 2014   (JP) .................................. 2014-95852

(51) Int. Cl.
    *H02P 6/10*     (2006.01)
    *H02P 27/08*     (2006.01)
    *B62D 5/04*     (2006.01)

(52) U.S. Cl.
    CPC .............. *H02P 6/10* (2013.01); *B62D 5/0463* (2013.01); *H02P 27/08* (2013.01)

(58) Field of Classification Search
    CPC ............................... H02P 27/08; B62D 5/0463
    See application file for complete search history.

(56) References Cited

U.S. PATENT DOCUMENTS

| | | | |
|---|---|---|---|
| 4,814,964 A | 3/1989 | Schauder et al. | |
| 2004/0264075 A1* | 12/2004 | Kolomeitsev | B62D 5/0403 361/23 |
| 2010/0244755 A1* | 9/2010 | Kinugasa | B60L 15/025 318/400.23 |
| 2010/0289372 A1* | 11/2010 | Taniguchi | H02K 3/28 310/195 |
| 2011/0278978 A1 | 11/2011 | Taniguchi et al. | |
| 2012/0049782 A1* | 3/2012 | Suzuki | H02M 1/14 318/807 |
| 2013/0033210 A1 | 2/2013 | Suzuki et al. | |

(Continued)

FOREIGN PATENT DOCUMENTS

| | | |
|---|---|---|
| EP | 0 466 672 | 1/1992 |
| JP | 41-601 | 1/1966 |

(Continued)

*Primary Examiner* — Shawki S Ismail
*Assistant Examiner* — Muhammad S Islam
(74) *Attorney, Agent, or Firm* — Nixon & Vanderhye PC

(57) ABSTRACT

A control device for controlling a multi-phase AC motor generating a steering assist torque in an electric power steering device of a vehicle, includes: first and second inverters in first and second systems that output first and second alternating current voltages to first and second multi-phase winding wire sets, respectively; and a control unit that controls a phase difference between the first and second alternating current voltages. The first and second multi-phase winding wire sets provide a stator of the motor, and generate a rotating magnetic field in a rotor. The control unit sets a control range including a reference phase difference, which reduces a specified-order harmonic component, and changes the phase difference within the control range according to a characteristic required of the motor, or so as to cause a fluctuation in the energization of the motor.

11 Claims, 12 Drawing Sheets

(56) References Cited

U.S. PATENT DOCUMENTS

| | | | |
|---|---|---|---|
| 2013/0200827 A1* | 8/2013 | Kezobo | H02P 29/0241 318/400.21 |
| 2014/0340015 A1* | 11/2014 | Hirotani | B62D 5/046 318/400.42 |
| 2015/0280502 A1* | 10/2015 | Hirotani | H02K 1/2746 310/68 R |

FOREIGN PATENT DOCUMENTS

| | | |
|---|---|---|
| JP | 41-13424 | 7/1966 |
| JP | 59-194691 | 11/1984 |
| JP | 63-056102 | 3/1988 |
| JP | 2005-057942 | 3/2005 |
| JP | 2007-020320 | 1/2007 |

\* cited by examiner

CONTROL DEVICE FOR MULTI-PHASE AC MOTOR

CROSS REFERENCE TO RELATED APPLICATION

This application is based on Japanese Patent Application No. 2014-95852 filed on May 7, 2014, the disclosure of which is incorporated herein by reference.

TECHNICAL FIELD

The present disclosure relates to a control device for controlling current supply to a multi-phase AC motor.

BACKGROUND

Conventionally, a control device for a multi-phase AC motor with three or more phases has been known. The control device includes inverters in two systems corresponding to the pair of winding wire sets forming the multi-phase AC motor and controls current supply to each of the pair of winding wire sets. For example, the control device described in Patent Literature 1 includes, as a mechanical configuration, a motor having a pair of 3-phase winding wire sets at 30° angular intervals held therebetween, and 3-phase inverters in two systems which are connected to the pair of 3-phase winding wire sets. By applying 3-phase AC voltages having a phase difference therebetween to the pair of 3-phase winding wire sets, a reduction in torque ripple (pulsation) in the motor is achieved.

Among various AC motors mounted in vehicles, a column-mounted steering assist motor used in an electric power steering device is placed at a position particularly close to a driver. Accordingly, when a torque ripple is caused by a harmonic component superimposed on the fundamental sine wave of the AC voltage output from an inverter, not only vibration is applied to a steering wheel, but also the sound resulting from the torque ripple may be unpleasant to the driver's ear.

To prevent this, it has been known to use the technique disclosed in Patent Literature 1 or the like and provide the 3-phase AC voltages applied to the pair of winding wire sets with a phase difference of a 30° electric angle. This can mainly reduce fifth- and seventh-order harmonic components.

However, the sound which causes an uncomfortable feeling in the driver may be affected not only by the fifth- and seventh-order components, but also by an eleventh-, thirteenth-, or higher-order harmonic component depending on the relationship with the resonant frequency of the multi-phase AC motor mounted in the vehicle or the like. In addition, a person may feel that the sound heard when a given frequency distribution state steadily continues is more unpleasant to his ear than the sound heard when a specified-order harmonic component is momentarily generated.

Thus, when attention is focused on the problem of the "sound unpleasant to the driver's ear", the foregoing problem cannot completely be solved by merely fixing the phase difference between the AC voltages applied to the pair of 3-phase winding wire sets to 30° and reducing the torque ripple derived from the fifth- and seventh-order components.

PRIOR ART LITERATURE

Patent Literature

Patent Literature 1: JP 1990-70286 A (corresponding to U.S. Pat. No. 4,814,964)

SUMMARY

It is an object of the present disclosure to provide a control device for a multi-phase AC motor having a pair of winding wire sets to be used in an electric power steering device. The control device for the multi-phase AC motor reduces a sound unpleasant to the driver's ear.

According to an aspect of the present disclosure, a control device for controlling energization of a multi-phase AC motor, which generates a steering assist torque in an electric power steering device of a vehicle, the control device includes: a first inverter in a first system that outputs a first alternating current voltage to a first multi-phase winding wire set; a second inverter in a second system that outputs a second alternating current voltage to a second multi-phase winding wire set; and a control unit that controls a phase difference between the first alternating current voltage applied to the first multi-phase winding wire set and the second alternating current voltage applied to the second multi-phase winding wire set. The first inverter and the second inverter are electrically independent from each other. The first multi-phase winding wire set and the second multi-phase winding wire set provide a stator of the multi-phase AC motor, and generate a rotating magnetic field in a rotor. The control unit sets a control range including a reference phase difference, which reduces a specified-order harmonic component. The control unit changes the phase difference within the control range according to a characteristic required of the multi-phase AC motor, or so as to cause a fluctuation in the energization of the multi-layer AC motor.

In the present disclosure, while a driver steers a steering wheel in the electric power steering device of a vehicle, the state of distribution of a harmonic component is changed in accordance with the state of operation of a multi-phase AC motor which generates a steering assist torque, while giving consideration to reducing a torque ripple using a reference phase difference, or with a lapse of time. This can reduce a sound unpleasant to the driver's ear.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The embodiments of a control device for a multi-phase AC motor according to the present disclosure will be described below on the basis of drawings.

First, a description will be given of a configuration common to the plurality of embodiments with reference to FIGS. 1 to 3D. In each of the embodiments, the control device is used appropriately as a control device for a 3-phase AC motor used as a column-mounted steering assist motor in the electric power steering device of a vehicle.

(Configuration of Control Device for 3-Phase AC Motor)

Figure 2:
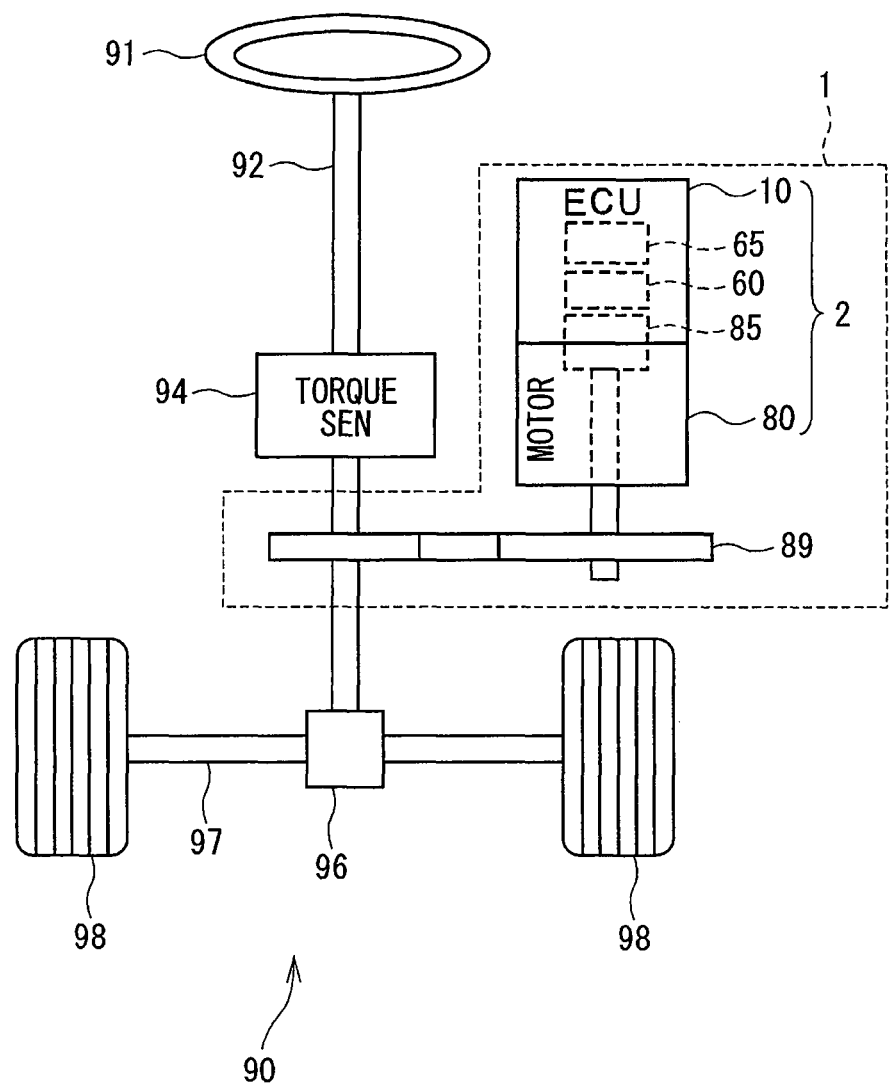
FIG. 2 is a schematic configuration diagram of an electric power steering device to which the control device for a 3-phase AC motor according to each of the embodiments of the present disclosure is applied.

FIG. 2 shows an overall configuration of a steering system 90 including an electric power steering device 1. A steering shaft 92 connected to a steering wheel 91 is provided with a torque sensor 94 for detecting a steering torque. The steering shaft 92 has a pinion gear 96 provided at the leading end thereof. The pinion gear 96 is meshed with a rack shaft 97. To the both ends of the rack shaft 97, a pair of vehicle wheels 98 are rotatively coupled via tie rods or the like. The rotational movement of the steering shaft 92 is converted by the pinion gear 96 to the linear movement of the rack shaft 97 to steer the pair of vehicle wheels 98 at an angle corresponding to the linear movement/displacement of the rack shaft 97.

The electric power steering device 1 includes an actuator 2 which rotates a rotating shaft, and a deceleration gear 89 which decelerates the rotation of the rotating shaft and transmits the decelerated rotation of the rotating shaft to the steering shaft 92.

The actuator 2 includes a 3-phase AC motor 80 which generates a steering assist torque, and an ECU 10 as a "control device" which drives the motor 80. The motor 80 is a 3-phase brushless motor in which a rotor placed inside a stator is rotated by a rotating magnetic field (see FIGS. 3A to 3D).

The ECU 10 includes a control unit 65, and an inverter 60 which controls power supply to the motor 80 in accordance with an instruction from the control unit 65. The ECU 10 is also provided with a rotation angle sensor 85 which detects the rotation angle of the motor 80. The rotation angle sensor 85 includes, e.g., a magnet provided in the motor 80, and a magnetic detection element provided in the ECU 10.

The control unit 65 controls an output to the inverter 60 on the basis of a steering torque signal from the torque sensor 94, a rotation angle signal from the rotation angle sensor 85, or the like. Thus, the actuator 2 of the electric power steering device 1 generates a steering assist torque for assisting the steering of the steering wheel 91 and transmits the steering assist torque to the steering shaft 92.

Figure 1:
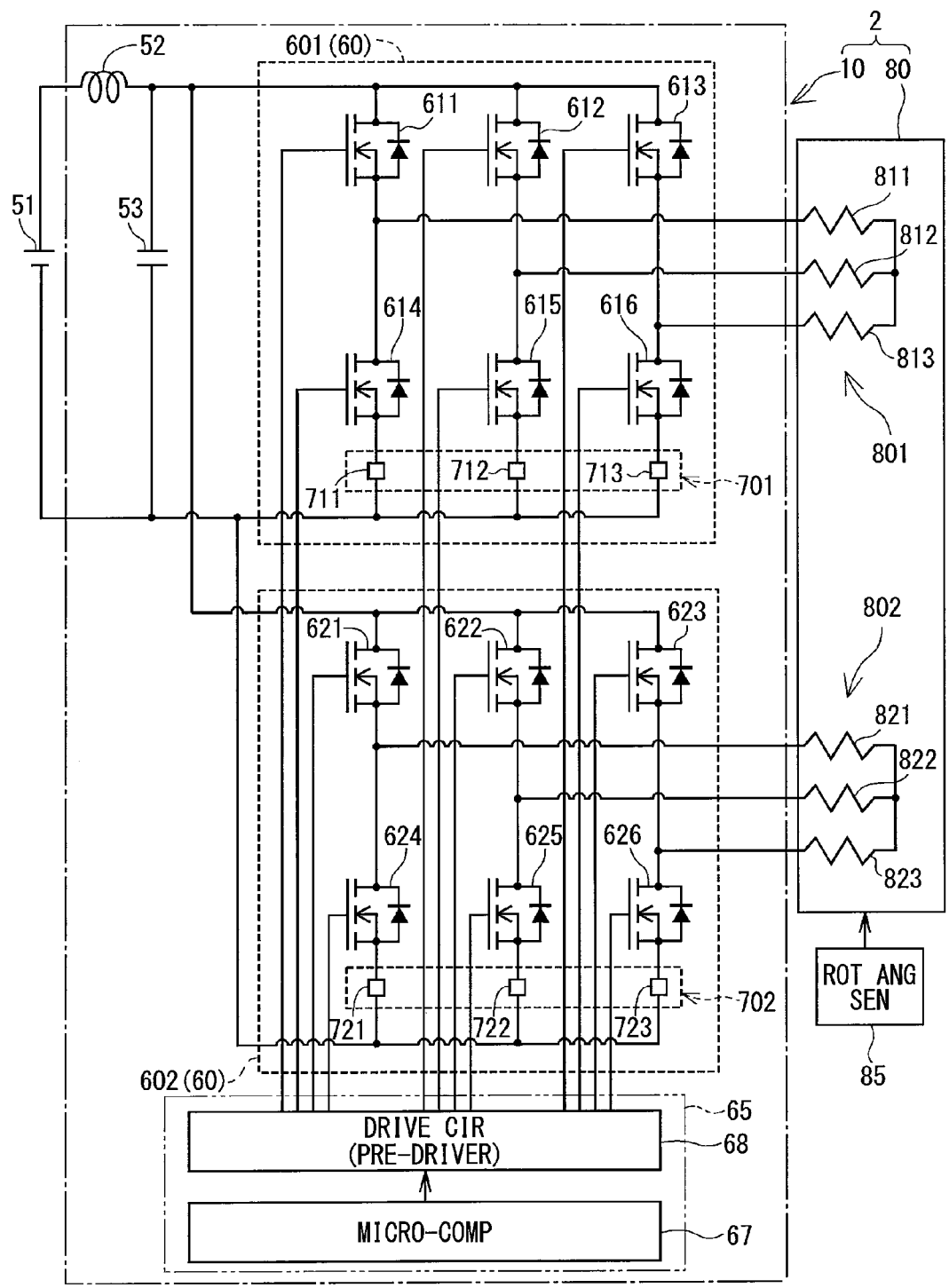
FIG. 1 is a circuit diagram of inverters in two systems which are controlled by a control device for a 3-phase AC motor according to each of the embodiments of the present disclosure.

Specifically, as shown in FIG. 1, the motor 80 has 3-phase winding wire sets 801 and 802 as a pair of "multi-phase winding wire sets". The 3-phase winding wire sets 801 and 802 form the stator to generate a rotating magnetic field in the rotor (see FIGS. 3A to 3D). The first winding wire set 801 includes 3-phase winding wires 811, 812, and 813 in U-, V-, and W-phases. The second winding wire set 802 includes 3-phase winding wires 821, 822, and 823 in U-, V-, and W-phases.

The inverter 60 includes a first-system inverter 601 provided in correspondence to the first winding wire set 801, and a second-system inverter 602 provided in correspondence to the second winding wire set 802. Hereinafter, a unitary combination of the inverter and each of the 3-phase winding wire sets corresponding to the inverter is referred to as a "system"

The ECU 10 includes a coil 52, a capacitor 53, the first-system inverter 601, the second-system inverter 602, a first-system current detector 701, a second-system current detector 702, the control unit 65, and the like. The current detectors 701 and 702 detect the phase currents supplied from the inverters 601 and 602 to the winding wire sets 801 and 802 on a per-phase basis.

The coil 52 and the capacitor 53 suppress the pulsation of the voltages input from a battery 51 to the inverters 601 and 602 to smooth the input voltages.

In the first-system inverter 601, six switching elements 611 to 616 are bridge-connected to switch current supply to any of the winding wires 811, 812, and 813 in the first winding wire set 801. The switching elements 611 to 616 in the present embodiment are MOSFETs (metal oxide semiconductor field effect transistors). The switching elements 611 to 616 are hereinafter referred to as MOSs 611 to 616.

The respective drains of the higher-potential MOSs 611, 612, and 613 are each connected to the positive electrode of the battery 51. The respective sources of the MOSs 611, 612, and 613 are connected to the respective drains of the lower-potential MOSs 614, 615, and 616. The respective sources of the MOSs 614, 615, and 616 are each connected to the negative electrode of the battery 51 via current detection elements 711, 712, and 713 forming the current detector 701. The respective connection points between the higher-potential MOSs 611, 612, and 613 and the lower-potential MOSs 614, 615, and 616 are connected to respective one ends of the winding wires 811, 812, and 813.

The current detection elements 711, 712, and 713 detect the respective phase currents supplied to the first-system U-, V-, and W-phase winding wires 811, 812, and 813.

In the second-system inverter 602 also, a configuration of switching elements (MOSs) 621 to 626 and current detection elements 721, 722, and 723 forming the current detector 702 is the same as in the first-system inverter 601.

The control unit 65 includes a microcomputer 67, a drive circuit (pre-driver) 68, and the like. The microcomputer 67 performs a control arithmetic operation between 3-phase voltage instruction values on the basis of a torque instruction, a feedback current, a rotation angle signal, and the like. The drive circuit 68 generates a PWM signal on the basis of the 3-phase voltage instruction values and outputs the PWM signal to the gate of each of the MOSs 611 to 616 and 621 to 626. As a result of a switching operation performed by each of the MOSs 611 to 616 and 621 to 626 in accordance with the PWM signal, intended AC voltages are applied from the inverters 601 to 602 to the winding wire sets 801 and 802.

The configuration of the motor 80 which controls current supply using the control device in the present embodiment will be further described with reference to FIGS. 3A to 3D. The FIGS. 3A to 3D are the same as disclosed in, e.g., JP 2014-50150 A or the like.

Figure 3A:
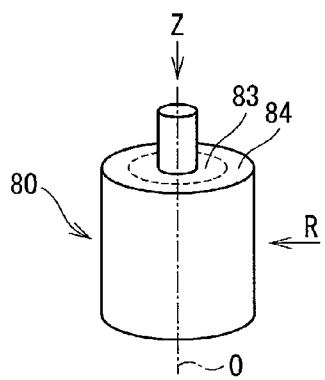
FIGS. 3A to 3D are schematic diagrams of a 3-phase AC motor to which the control device according to each of the embodiments of the present disclosure is applied.

As shown in FIG. 3A, in the motor 80, the rotor 83 rotates around a rotation axis o relative to the stator 84. In the motor 80, when m is assumed to be a natural number, the number of coils of the stator 84 is (12×m) and the pole number of a permanent magnet 87 of the rotor 83 is (2×m). FIGS. 3A to 3D show an example in which m=2 is satisfied. Note that m may also be a natural number other than 2.

Figure 3B:
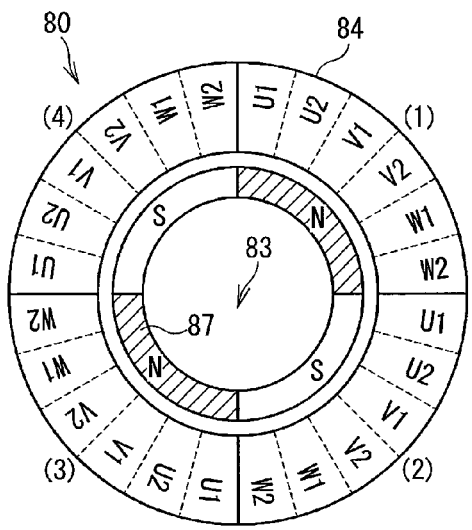

FIG. 3B is a schematic diagram of the permanent magnet 87 of the rotor 83 and the stator 84 when viewed from a thrust direction Z (see FIG. 3A). The permanent magnet 87 is provided with the total of four (=2×2) poles which are alternating two N-poles and two S-poles. Stator coils include four coil sets each including six coils, i.e., twenty-four (=12×2) coils. In each of the coil sets, a U1 coil, a U2 coil, a V1 coil, a V2 coil, a W1 coil, and a W2 coil are arranged clockwise in this order at 30° electric angle intervals. Also, a pair of coil sets form "one winding wire set".

Figure 3C:
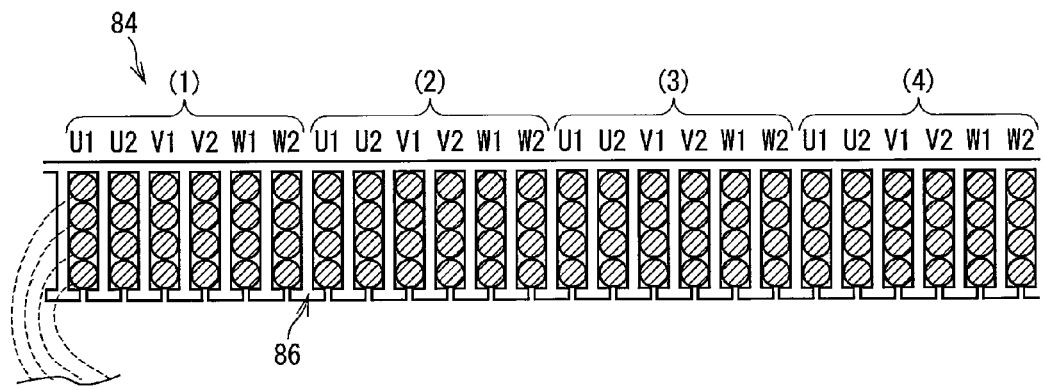
Figure 3D:
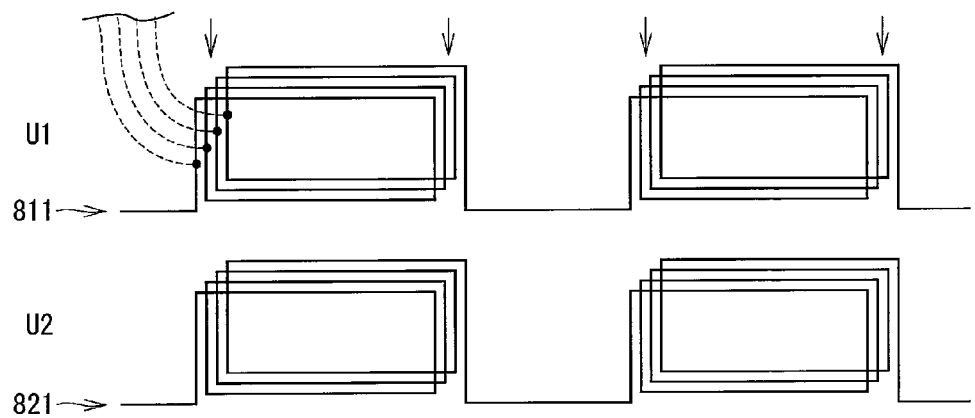

FIG. 3C is a development diagram of the stator 84 when viewed from the thrust direction Z. FIG. 3D is a development diagram of the winding wires when viewed from a radial direction R (see FIG. 3A). As shown in FIG. 3D, the winding wire forming, e.g., the U1 coil is formed of a conductive wire which is wound successively around every sixth one of projecting portions 86.

Consequently, in the U-phase, the electric angle of the U1 coil 811 is 0° and the electric angle of the U2 coil 821 is +30°. This places the U2 coil 821 and the U1 coil 811 in a positional relationship such that the U2 coil 821 is at +30° from the U1 coil 811. Likewise, in the W-phase also, the W2 coil 823 having an electric angle of +150° and the W1 coil 813 having an electric angle of +120° are in a positional relationship such that the W2 coil 823 is at +30° from the W1 coil 813. In the V-phase, by reversely supplying a current, the electric angle of the V1 coil 812 is (60°−180°=)−120° and the electric angle of the V2 coil 822 is (90°−180°=)−90°. This places the V2 coil 822 and the V1 coil 812 in a positional relationship such that the V2 coil 822 is at +30° from the V1 coil 812.

When the first-system inverter 601 and the second-system inverter 602 output AC voltages with the same timing using the motor 80 having such a configuration, the phase of the 3-phase AC voltage applied to the second winding wire set 802 is lagging behind the phase of the 3-phase AC voltage applied to the first winding wire set 801 by a 30° electric angle. That is, using the mechanical configuration of the motor 80, the phase difference of a 30° electric angle can be produced. The phase difference of the 30° electric angle mentioned herein corresponds to a "reference phase difference" described later.

<Relationship between Phase Difference Between AC Voltages and Torque Ripple Due to Harmonic Component>

Figure 4:
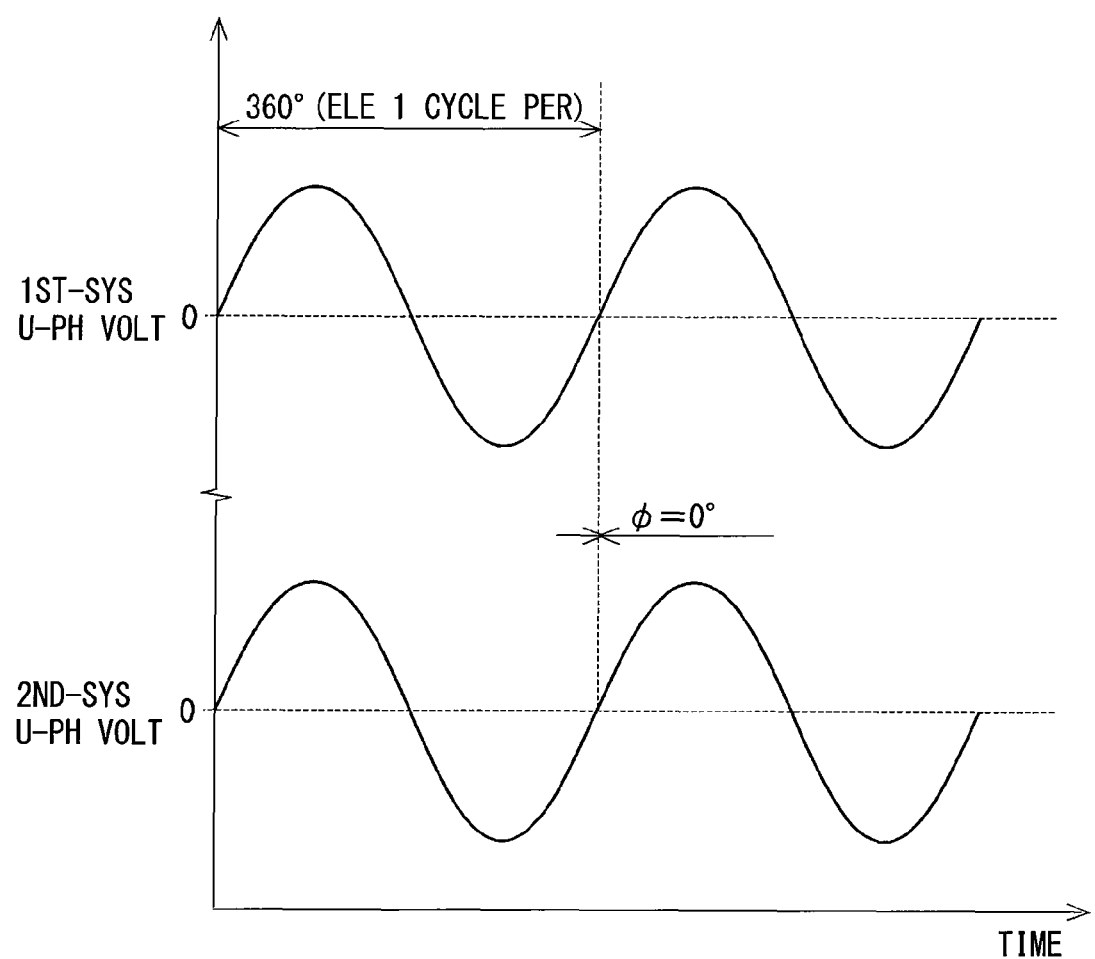
FIG. 4 is a waveform chart when the phase difference between the two systems is 0°.

The electric angle phase difference between the AC voltages applied to the two winding wire sets 801 and 802 is hereinafter referred to as a "phase difference between two systems" or simply as "phase difference". Next, a description will be given of the relationship between the phase difference between the two systems and a torque ripple due to a harmonic component with reference to FIGS. 4 to 7. Each of the drawings including and subsequent to FIG. 4 shows the waveform of a U-phase voltage as an example of a phase voltage waveform. Precisely, an AC voltage has a distorted waveform on which a harmonic component is superimposed but, for the sake of convenience, only a fundamental wave having a sinusoidal waveform is shown.

Figure 5:
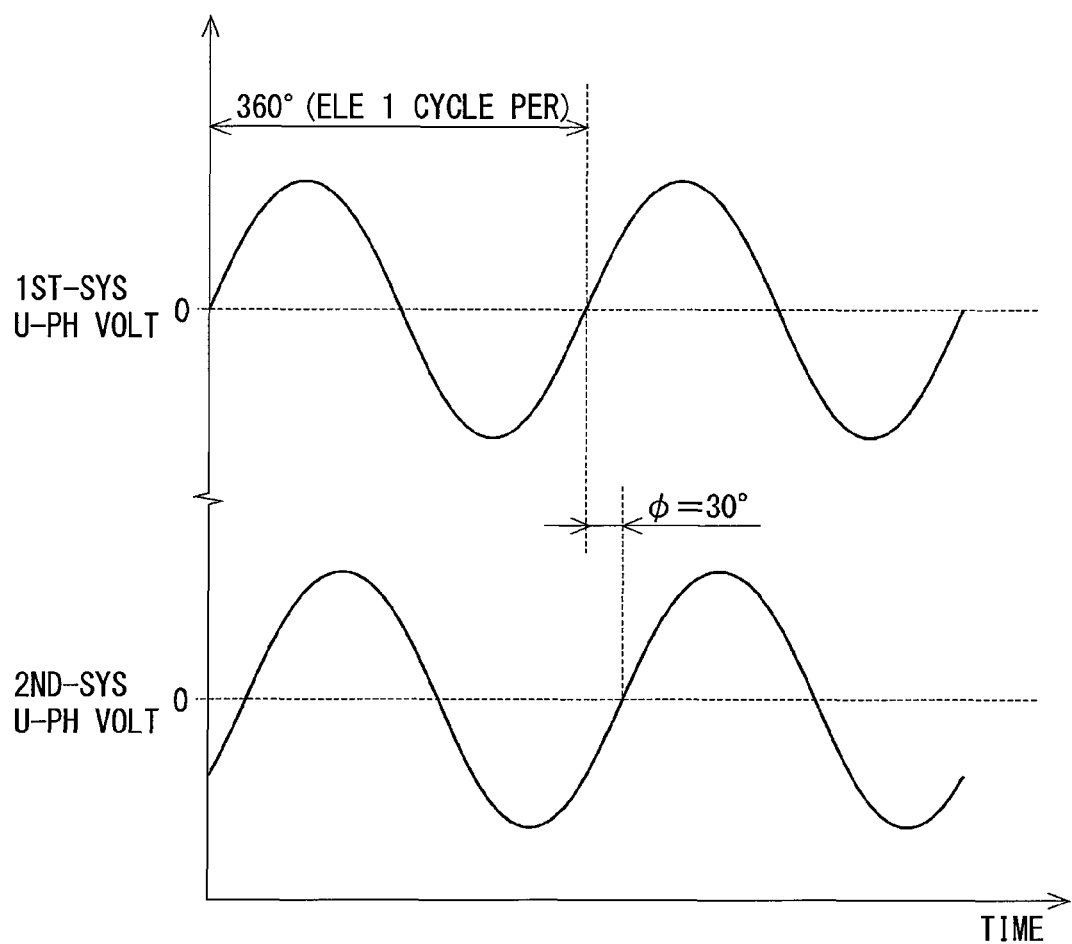
FIG. 5 is a waveform chart when the phase difference between the two systems is 30°.

FIG. 4 shows the waveform when the phase difference between the two systems is 0°. FIG. 5 shows the waveform when the phase difference between the two systems is 30°. By way of example, FIG. 5 shows the case where the second-system phase is lagging behind the first-system phase. However, the following description similarly applies also to the case where the second-system phase is leading the first-system phase.

Figure 6A:
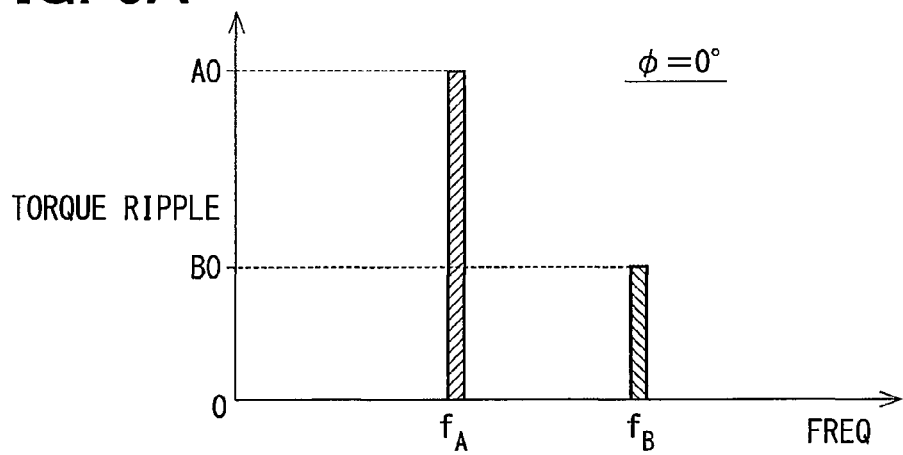
FIG. 6A is a view of a torque ripple due to a specified-order harmonic component when the phase difference between the two systems is 0° and FIG. 6B is a view of a torque ripple due to a specified-order harmonic component when the phase difference between the two systems is 30°.
Figure 6B:
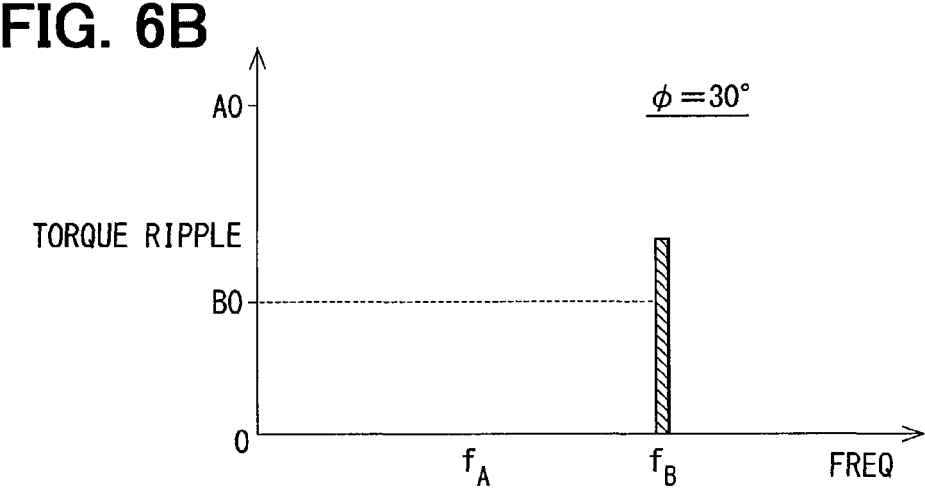

FIGS. 6A and 6B show torque ripples due to harmonic components when the phase difference is 0° and when the phase difference is 30°. Each of FIGS. 6A and 6B schematically shows a frequency-torque ripple characteristic in which "fA" represents a frequency corresponding to fifth- and seventh-order harmonic components and "fB" represents a frequency corresponding to eleventh- and thirteenth-order harmonic components. Hereinafter, the torque ripple due to the fifth- and seventh-order harmonic components is referred to as an "A-th-order torque ripple" and the torque ripple due to the eleventh- and thirteenth-order torque ripple is referred to as a "B-th-order torque ripple".

As shown in FIG. 6A, A0 represents the value of the A-th-order torque ripple and B0 represents the value of the B-th-order torque ripple when Phase Difference $\phi=0°$ is satisfied. When Phase Difference $\phi=0°$ is satisfied, the value A0 is larger than the value B0. On the other hand, as shown in FIG. 6B, when Phase Difference $\phi=30°$ is satisfied, the A-th-order torque ripple is removed, while the value of the B-th-order torque ripple is larger than B0.

Figure 7:
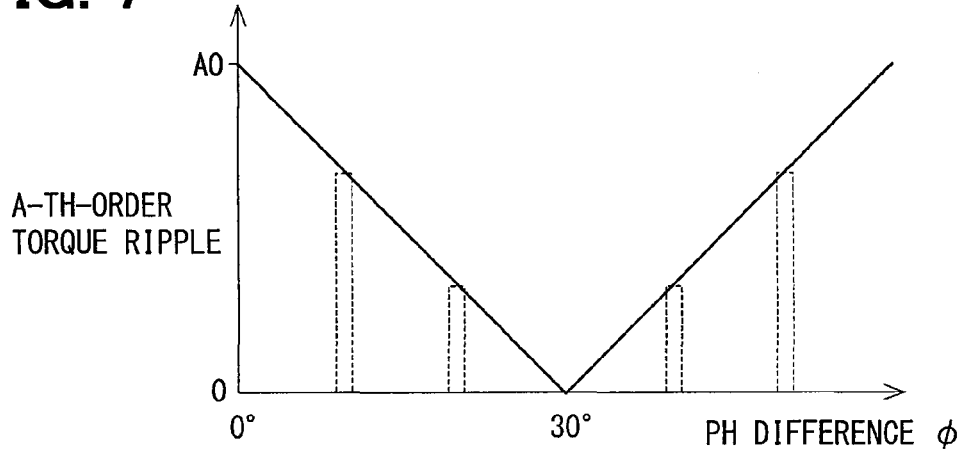
FIG. 7 is a view showing the relationship between the phase difference and an A-th-order torque ripple.

As shown in FIG. 7, the A-th-order torque ripple is 0 when the phase difference $\phi$ is 30°. As the phase difference $\phi$ is farther away from 30°, the A-th-order torque ripple symmetrically increases around 30°. The broken-line bar shows the magnitude of the A-th-order torque ripple when the drawing corresponding to FIGS. 6A and 6B at the phase difference $\phi$ is shown.

In this case, the 30° phase difference $\phi$ corresponds to the "reference phase difference" which can reduce the A-th-order torque ripple as a "specified-order harmonic component".

In general, in order to reduce the vibration transmitted to the steering wheel 91, it is effective to reduce the A-th-order torque ripple. However, in terms of a sound unpleasant to the driver's ear, the influence of the B-th-order torque ripple may be larger depending on the relationship with the resonance frequency of the motor 80 in a vehicle-mounted state or the like. Accordingly, the state where Phase Difference $\phi=30°$ is satisfied is not always preferred to the state where Phase Difference $\phi=0°$ is satisfied.

In addition, a human sense may be such that the state where the frequency randomly changes is less annoying than the state where a sound at a given frequency steadily continues.

In view of such a background, the control unit 65 of the ECU 10 sets a control range including the 30° reference phase difference and performs "phase difference control" which changes the phase difference within the control range. For example, the control unit 65 shifts the timings of PWM signals to the inverters 601 and 602 in the two systems in the control range including the 30° reference phase difference to thus change the phase difference φ.

Here, the technical idea that the control unit 65 changes the phase difference φ is based on the following two general ideas.

(1) The phase difference φ is changed on the basis of the characteristic required of the motor 80.

(2) The phase difference φ is changed so as to cause fluctuations in current supply to the motor 80.

In the first idea, the phase difference φ is defined as a function using any physical quantity related to a motor output as a parameter. The control unit 65 controls the phase difference φ in accordance with the function. In the second idea, the phase difference φ is defined as a function using, e.g., a time as a parameter. The control unit 65 controls the phase difference φ with time variation. It may be said that the second idea is close to dither control.

A description will be given of a specific configuration of phase difference control performed by the ECU 10 on a per-embodiment basis.

First Embodiment

Figure 8:
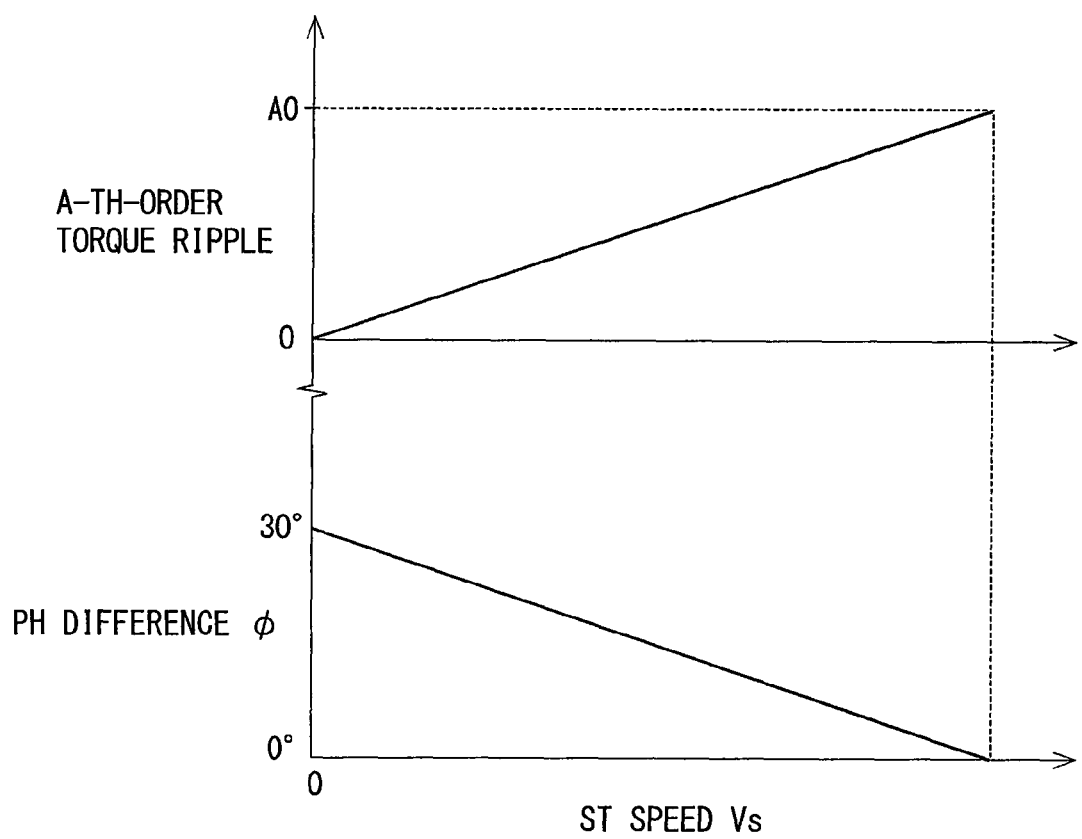
FIG. 8 is a view showing the relationship between a steering speed and each of the phase difference and the A-th-order torque ripple under phase difference control in the first embodiment of the present disclosure.

Referring to FIG. 8, a description will be given of phase difference control according to the first embodiment of the present disclosure. In the first embodiment, the phase difference φ is changed using a function using, as a parameter, a steering speed as the "characteristic required of the 3-phase AC motor".

In the example shown in FIG. 8, the phase difference φ when a steering speed Vs is 0 is set to 30° as the reference phase difference and the phase difference φ is gradually reduced to 0° as the steering speed Vs increases. The A-th-order torque ripple is 0 when the steering speed Vs is 0 and gradually increases to the value A0 when Phase Difference φ=0° is satisfied as the steering speed Vs increases. That is, the range from 0° to 30° corresponds to the control range.

When the steering speed Vs is low, i.e., when the steering wheel 91 is slowly turned, the phase difference φ is set to the reference phase difference to reduce the A-th-order torque ripple and thus suppress the vibration of the steering wheel 91. On the other hand, when the steering speed Vs is high, i.e., when the steering wheel 91 is rapidly turned, the phase difference φ is brought closer to 0° to reduce the B-th-order torque ripple and thus reduce a sound unpleasant to the drivers' ear.

The settings of the details of the change pattern of the phase difference φ, e.g., the gradient of the phase difference φ with respect to the steering speed Vs is preferably tuned on a per-vehicle basis in consideration of the resonance frequency in the state where the motor 80 is mounted in a vehicle.

Figure 9:
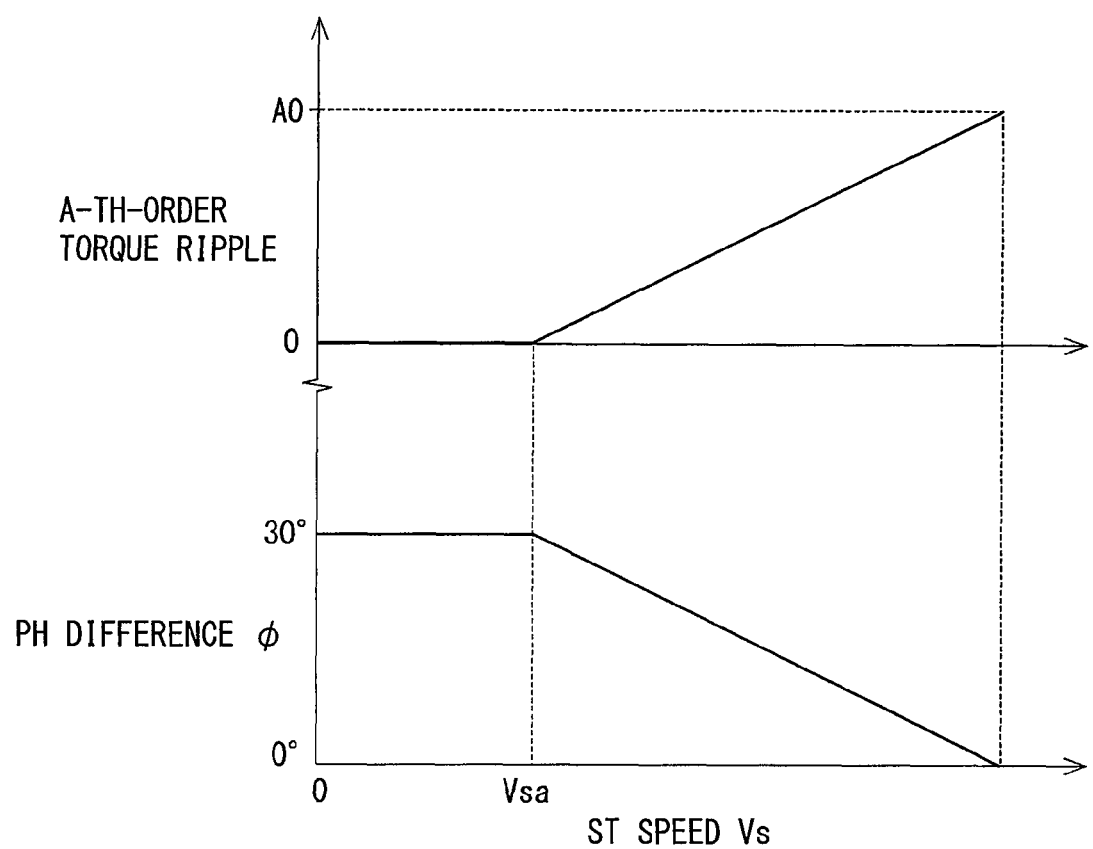
FIG. 9 is a view showing the relationship between the steering speed and each of the phase difference and the A-th-order torque ripple under phase difference control in a modification of the first embodiment.

In a modification of the phase difference control based on the steering speed Vs, as shown in FIG. 9, it may also be possible to fix the phase difference φ to 30° when the steering speed Vs is in the range of 0 to a predetermined speed Vsa and gradually reduce the phase difference φ when the steering speed Vs exceeds the predetermined speed Vsa. The phase difference control is not limited to an example in which the phase difference is linearly gradually reduced. The phase difference φ may also be changed stepwise on a per-predetermined-range basis or curvedly changed.

The example shown in FIG. 9 also has the characteristic feature of the present disclosure in that, when consideration is given to the entire range of the steering speed Vs, unlike in the prior art in which the phase difference φ is uniformly fixed, the phase difference φ is changed within the control range.

A description will be given of the function/effect of the present embodiment.

(1) By changing the phase difference φ on the basis of the steering speed Vs, the ECU 10 allows switching between the "state where the phase difference φ is 30° and the A-th-order torque ripple is removed" and the "state where the phase difference φ is between 30° and 0° and the A-th-order torque ripple is generated to a degree, but the B-th-order torque ripple decreases". This can reduce a sound unpleasant to the driver's ear throughout the entire steering period compared to the case where the phase difference φ is fixed to 30° as in the prior art.

(2) Conventionally, as a technique which reduces a specified-order torque ripple resulting from the pole/slot configuration of the motor, magnet skew magnetization, skew slot, or the like has been known. However, such a technique has the problems of a complicated structure and increased manufacturing cost. By contrast, in the present embodiment, the phase difference φ is produced by, e.g., shifting the timings of PWM signals to the inverters 601 and 602 in the two systems. This can appropriately reduce a specified-order torque ripple without using a high-cost skew structure. In particular, by using the motor 80 having the configuration shown in FIG. 3A to 3D, 30° as the reference phase difference can be produced with a mechanical configuration.

(3) The ECU 10 in the present embodiment is used as a control device for current supply to the motor 80 which generates a steering assist torque in the electric power steering device 1 of a vehicle. In particular, the column-mounted motor 80 is placed at a position closest to the driver among the various AC motors mounted in the vehicle. Accordingly, the sound due to a specified-order harmonic component is likely to be unpleasant to the driver's ear. Therefore, the function/effect of the present disclosure which changes the phase difference φ is achieved particularly effectively.

Second Embodiment

Figure 10:
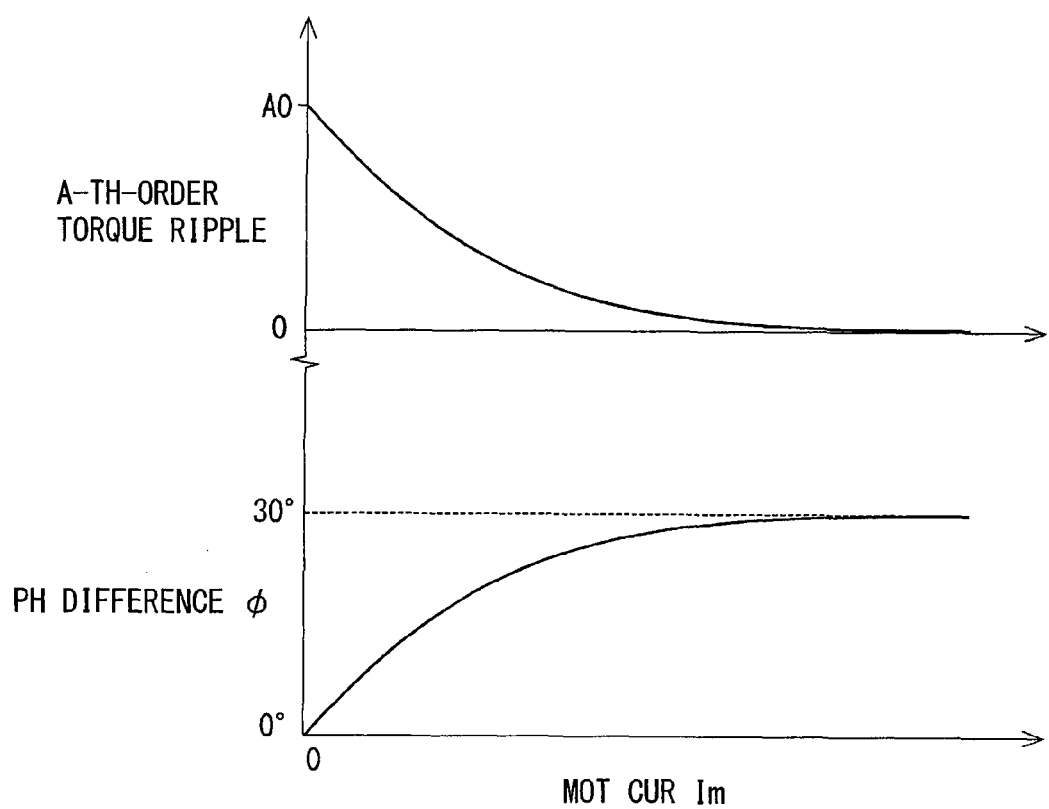
FIG. 10 is a view showing the relationship between a motor current and each of the phase difference and the A-th-order torque ripple under phase difference control in the second embodiment of the present disclosure.

Referring to FIG. 10, a description will be given of phase difference control according to the second embodiment of the present disclosure. In the second embodiment, the phase difference φ is changed using a function using, as a parameter, a motor current as the "characteristic required of the 3-phase AC motor".

In the example shown in FIG. 10, the phase difference φ is set to 0° when a motor current Im is 0 and, as the motor current Im increases, the phase difference φ is changed to gradually approach 30° as the reference phase difference. The A-th-order torque ripple has the value A0 when the motor current Im is 0 and gradually approaches 0 as the motor current Im increases.

As the motor current Im, the amplitudes of the phase currents detected by the current detectors 701 and 702 may be used or effective values may also be used. Alternatively, d- or q-axis currents obtained by subjecting phase current detected values to d-q conversion may also be used.

When the motor current Im is large and the steering torque is large, the phase difference φ is set to the reference phase difference to reduce the A-th-order torque ripple and suppress the vibration of the steering wheel 91. On the other hand, when the motor current Im is small and the steering torque is small, the phase difference ϕ is brought closer to 0 to reduce the B-th-order harmonic component and thus reduce a sound unpleasant to the driver's ear. This achieves the same effect as achieved in the first embodiment.

Third Embodiment

Next, referring to FIGS. 11 to 13B, a description will be given of phase difference control according to the third embodiment of the present disclosure. The phase difference control according to the third embodiment causes fluctuations in current supply to the motor 80. Specifically, the control unit 65 changes the phase difference ϕ with a lapse of time.

Figure 11:
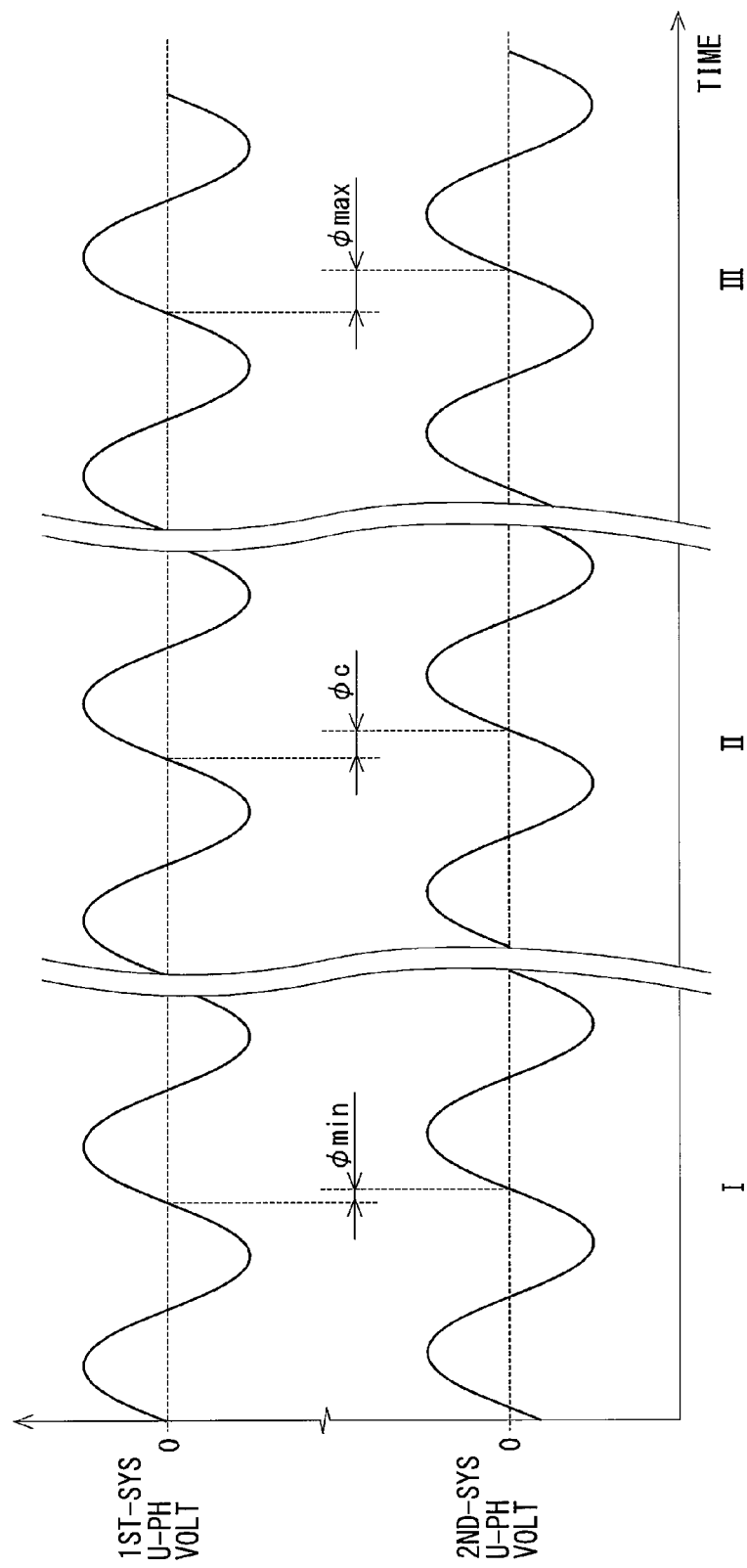
FIG. 11 is a waveform chart illustrating phase difference control in the third embodiment of the present disclosure.
Figure 12:
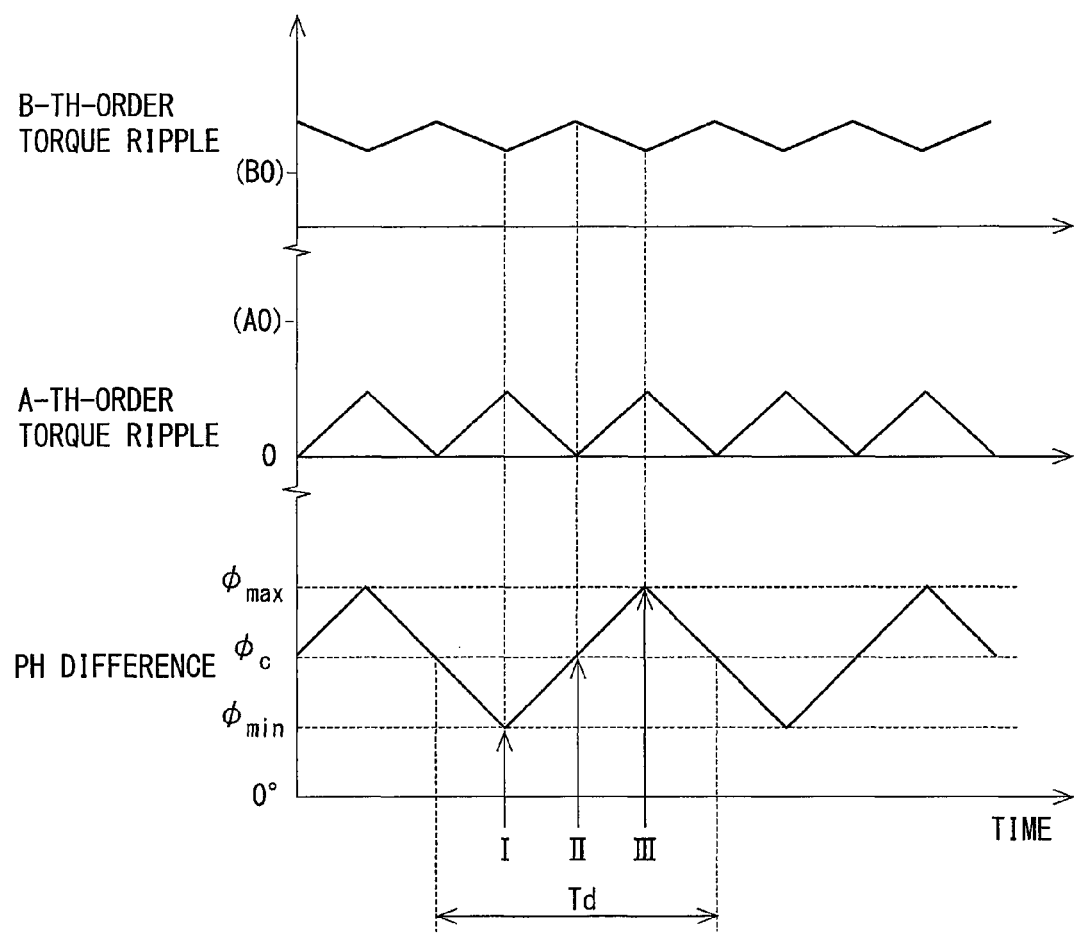
FIG. 12 is a view showing variation in each of phase difference and torque ripple under the phase difference control in the third embodiment of the present disclosure.

As shown in FIGS. 11 and 12, the phase difference between U-phase voltages periodically changes to reach a minimum value ϕmin during a period I along a time axis, reach a center value ϕc during a period II along the time axis, and reach a maximum value ϕmax during a period III along the time axis. In the example shown in FIG. 12, the phase difference linearly changes relative to time from the minimum value ϕmin to the maximum value ϕmax. Here, the center value ϕc is set to 30° as the reference phase difference. Also, the minimum value ϕmin and the maximum value ϕmax are respectively set to, e.g., 15° and 45° such that the difference therebetween is larger than the reference phase difference.

Referring to the relationship between the phase difference ϕ and the A-th-order torque ripple shown in FIG. 7, the A-th-order torque ripple changes so as to become 0 when the phase difference ϕ has the center value ϕc and become maximum when the phase difference ϕ has the minimum value ϕmin or the maximum value ϕmax. On the other hand, as described in the first embodiment, the B-th-order torque ripple tends to be smaller as the phase difference ϕ is farther away from the center value ϕc.

One cycle period Td of the phase difference change is set to a time period sufficiently longer than the cycle period of an AC voltage, e.g., a time period of about 1 second. When the time required to turn the steering wheel 91 from a left rotation limit position to a right rotation limit position is assumedly 2 to 3 seconds, the phase difference changes in two to three cycles during the time. That is, the phase difference ϕ changes in such a time as to allow the driver to normally recognize the change.

When such phase difference control is performed, the distribution of a harmonic component periodically changes upon operation of the steering wheel 91 at a relatively large angle. As a result, the sound resulting from the harmonic component periodically changes. A person may feel uncomfortable when a sound at a specified frequency steadily continues. Accordingly, by periodically changing the frequency of the sound and "dispersing" the sound unpleasant to the driver's ear, it is possible to reduce the uncomfortable feeling.

In addition, by setting the control range in which the phase difference is changed around 30° as the reference phase difference, it is possible to evenly reduce the A-th-order (fifth- or seventh-order) torque ripple and thus reduce the vibration applied to the steering wheel 91.

Figure 13A:
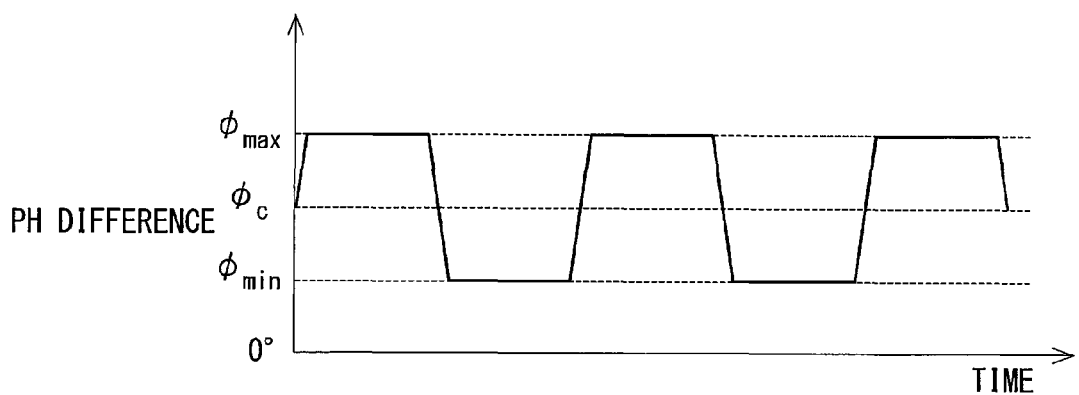
FIGS. 13A and 13B are views each showing variation with time in phase difference under phase difference control in a modification of the third embodiment.
Figure 13B:
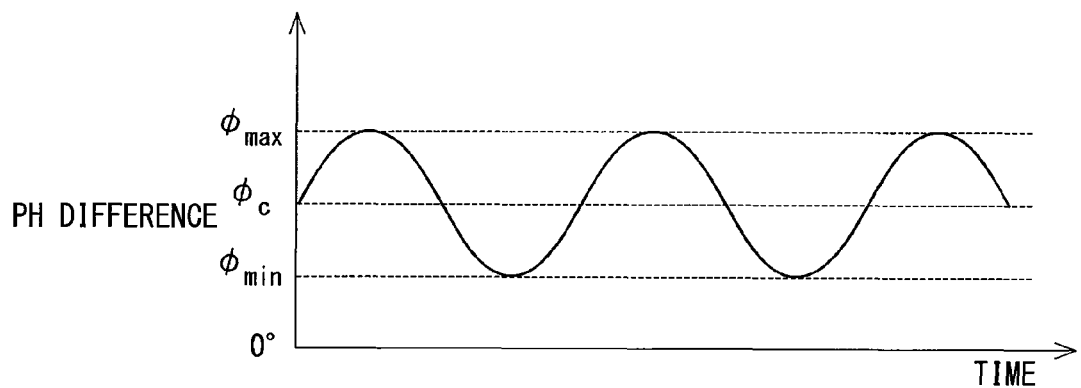

FIGS. 13A and 13B show a modification of the change pattern of the phase difference in the third embodiment.

As shown in FIG. 13A, it may also be possible to hold the phase difference at the minimum value ϕmin and the maximum value ϕmax for a given time period and suddenly change the minimum value ϕmin and the maximum value ϕmax. Instead of or in addition to being held at the minimum value ϕmin and the maximum value ϕmax, the phase difference may also be held at the center value ϕc for a given time period.

Alternatively, as shown in FIG. 13B, the phase difference may also be changed as a sinusoidal wave function relative to time. This allows the change to be smoother than in the example shown in FIG. 12.

Other Embodiments (a) In the present disclosure, the function which defines the change of the phase difference is not limited to the function using the steering speed, motor current, or time as a parameter, which has been shown by way of example in each of the foregoing embodiments. In the embodiment which "changes the phase difference on the basis of the characteristic required of the multi-phase AC motor", the changing of the phase difference may also be defined by a function using a steering acceleration rate, steering torque, assist torque, or the like as a parameter.

On the other hand, in the embodiment which "causes fluctuations in current supply to the multi-phase AC motor", a fluctuation cycle period may also be defined on the basis of not only time, but also, e.g., the cumulative rotation angle of the motor. The fluctuation cycle period may also be variable without being fixed.

(b) As described above, the detailed change pattern of the phase difference is preferably tuned on a per-vehicle basis after the multi-phase AC motor is mounted on a vehicle. However, strictly speaking, optimal tuning may vary every time the vehicle runs depending on how many people get in the vehicle, where the people are seated, the weight or position of baggage, or who drives the vehicle. Accordingly, it may also be possible to determine optical tuning by learning control, while acquiring information on the behavior of the vehicle, the resonance frequency, or the like while the vehicle is running.

(c) The present disclosure is not limited to the 3-phase AC motor shown by way of example in each of the foregoing embodiments. The present disclosure is applicable to a control device for a multi-phase motor with four or more phases. As the reference phase difference or the changing characteristic of the phase difference in that case, preferable values may theoretically or experimentally be set appropriately. The "specified-order harmonic component" which is reduced using the reference phase difference is each of the fifth- and seventh-order harmonic components in the 3-phase AC motor, but the specified order varies in accordance with the number of phases.

The motor to be controlled is not limited to a motor having the configuration shown by way of example in FIGS. 3A to 3D. The control device may also appropriately determine a specific method which changes the phase difference between two systems in accordance with the configuration of the motor.

(d) The specific configuration of the ECU 10 is not limited to the configuration in each of the foregoing embodiments. For example, the switching elements may also be field effect transistors other than MOSFETs, IGBTs, or the like.

(e) The control device of the present disclosure may also include inverters in three or more systems and control current supply to the multi-phase AC motor including three or more multi-phase winding wire sets corresponding to the individual inverters. A control device in which the phase difference between AC voltages in any two of three or more systems satisfies the requirement for the present disclosure is included in the technical scope of the present disclosure.

The above disclosure has the following aspects.

According to an aspect of the present disclosure, a control device for controlling energization of a multi-phase AC motor, which generates a steering assist torque in an electric power steering device of a vehicle, the control device includes: a first inverter in a first system that outputs a first alternating current voltage to a first multi-phase winding wire set; a second inverter in a second system that outputs a second alternating current voltage to a second multi-phase winding wire set; and a control unit that controls a phase difference between the first alternating current voltage applied to the first multi-phase winding wire set and the second alternating current voltage applied to the second multi-phase winding wire set. The first inverter and the second inverter are electrically independent from each other. The first multi-phase winding wire set and the second multi-phase winding wire set provide a stator of the multi-phase AC motor, and generate a rotating magnetic field in a rotor. The control unit sets a control range including a reference phase difference, which reduces a specified-order harmonic component. The control unit changes the phase difference within the control range according to a characteristic required of the multi-phase AC motor, or so as to cause a fluctuation in the energization of the multi-layer AC motor.

The wording "changes the phase difference on the basis of a characteristic required of the multi-phase AC motor" used herein refers to changing the phase difference on the basis of a physical quantity directly related to the rotation-number/torque characteristic required of the motor, specifically a speed at which a driver steers a steering wheel, the current supplied to the motor, or the like. In this case, it is preferable to respond to a change in steering speed or motor current and immediately change the phase difference.

On the other hand, the wording "changes the phase difference so as to cause fluctuations in the current supply to the multi-layer AC motor" refers to changing the phase difference in a relatively long cycle period, which is close to the idea of dither control. Specifically, the foregoing wording refers to changing the phase difference in a cycle period of, e.g., about 1 second with a lapse of time.

The technical idea common to two embodiments is not to fix the phase difference between the AC voltages applied to the pair of multi-phase winding wire sets, but to define the phase difference as a function using any physical quantity as a parameter and change the phase difference in accordance with the function during the operation of the multi-phase AC motor.

The control range in which the phase difference is changed is set so as to include the reference phase difference which can reduce a specified-order harmonic component. When the multi-phase AC motor is a 3-phase AC motor, the reference phase difference is preferably a phase difference which can reduce fifth- and seventh-order harmonic components.

For example, in the embodiment in which the phase difference is changed in accordance with the steering speed, it is appropriate to use the reference phase difference in the lower steering speed range and bring the phase difference closer to 0 as the steering speed increases.

On the other hand, in the embodiment in which the phase difference is changed with a lapse of time, it is appropriate to periodically change the phase difference in the control range from a predetermined minimum value to a predetermined maximum value which is set so as to include the reference phase difference.

In the present disclosure, while a driver steers a steering wheel in the electric power steering device of a vehicle, the state of distribution of a harmonic component is changed in accordance with the state of operation of a multi-phase AC motor which generates a steering assist torque, while giving consideration to reducing a torque ripple using a reference phase difference, or with a lapse of time. This can reduce a sound unpleasant to the driver's ear. Preferably, a specific change pattern is tuned on a per-vehicle basis depending on the relationship with the resonance frequency of the multi-phase AC motor or the like.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for controlling energization of a multi-phase AC motor, which generates a steering assist torque in an electric power steering device of a vehicle, the control device comprising:
    a first inverter in a first system that outputs a first alternating current voltage to a first multi-phase winding wire set;
    a second inverter in a second system that outputs a second alternating current voltage to a second multi-phase winding wire set; and
    a control unit that controls a phase difference between the first alternating current voltage applied to the first multi-phase winding wire set and the second alternating current voltage applied to the second multi-phase winding wire set,
    wherein the first inverter and the second inverter are electrically independent from each other,
    wherein the first multi-phase winding wire set and the second multi-phase winding wire set provide a stator of the multi-phase AC motor, and generate a rotating magnetic field in a rotor,
    wherein the control unit sets a control range including a reference phase difference, which reduces a torque ripple due to a specified-order harmonic component as an A-th order torque ripple, and another phase difference which reduces another torque ripple due to another specified-order harmonic component as a B-th order torque ripple, and
    wherein the control unit changes the phase difference within the control range according to a steering speed of a driver as a characteristic required of the multi-phase AC motor.

2. The control device according to claim 1,
    wherein the control unit changes the phase difference based on a speed of a steering wheel operated by a driver of the vehicle.

3. The control device according to claim 1,
    wherein the control unit changes the phase difference based on a current supplied to the multi-phase AC motor.

4. The control device according to claim 1,
wherein the control unit changes the phase difference with a lapse of time to cause the fluctuation in the energization of the multi-phase AC motor.

5. The control device according to claim 4,
wherein the control unit periodically changes the phase difference within the control range from a predetermined minimum value to a predetermined maximum value, and
wherein the predetermined minimum value and the predetermined maximum value are set in such a manner that the reference phase difference is disposed between the predetermined minimum value and the predetermined maximum value.

6. The control device according to claim 1,
wherein the multi-phase AC motor is a three-phase AC motor, and
wherein the reference phase difference reduces a fifth-order harmonic component and a seventh-order harmonic component.

7. The control device according to claim 1, wherein:
the control unit changes the phase difference based on a steering speed of the vehicle.

8. The control device according to claim 1, wherein:
the control unit changes the phase difference based on a motor current.

9. The control device according to claim 1, wherein:
the control unit changes the phase difference based on a steering speed of the vehicle and a motor current.

10. The control device according to claim 1, wherein:
the A-th order torque ripple is a fifth order torque ripple or a seventh order torque ripple; and
the B-th order torque ripple is an eleventh order torque ripple or a thirteenth order torque ripple.

11. The control device according to claim 1, wherein:
the phase difference is set to 30° as the reference phase difference when the steering speed is 0;
the phase different is reduced to 0° as the steering speed increases so that a range from 0° to 30° corresponds to the control range.

* * * * *